United States Patent [19]

Hashimoto et al.

[11] Patent Number: 4,945,371
[45] Date of Patent: Jul. 31, 1990

[54] DEVICE FOR CONTROLLING A ZOOM LENS OF A CAMERA

[75] Inventors: Takeshi Hashimoto; Keisuke Maeda, both of Osaka, Japan

[73] Assignee: Minolta Camera Kabushiki Kaisha, Osaka, Japan

[21] Appl. No.: 399,592

[22] Filed: Aug. 28, 1989

[30] Foreign Application Priority Data

Aug. 29, 1988 [JP] Japan ................... 63-215928

[51] Int. Cl.$^5$ .............................................. G03B 3/10
[52] U.S. Cl. ................... 354/195.13; 354/195.1
[58] Field of Search ................... 354/195.1, 195.13

[56] References Cited

U.S. PATENT DOCUMENTS

| 4,568,165 | 2/1986 | Ishibashi | 354/195.1 |
| 4,855,782 | 8/1989 | Koleayashi et al. | 354/195.13 X |
| 4,887,107 | 12/1989 | Nakamura et al. | 354/195.12 |
| 4,890,135 | 12/1989 | Fujino et al. | 354/442 |

FOREIGN PATENT DOCUMENTS 61-109036 5/1986 Japan .
63-34524 2/1988 Japan .
63-174477 7/1988 Japan .

OTHER PUBLICATIONS

U.S. Patent Application Serial No. 080,572 filed Jul. 28, 1987.
U.S. Patent Application Serial No. 166,030 filed Mar. 9, 1988.

*Primary Examiner*—Michael L. Gellner
*Attorney, Agent, or Firm*—Willian, Brinks, Olds, Hofer, Gilson & Lione

[57] ABSTRACT

A device for controlling a zoom lens of a camera includes drive means for driving a zoom lens, control means for controlling the drive means, the control means having a plurality of selectable control modes having a linear mode and a stepping mode, or a plurality of stepping modes, and selection means for selecting one of the plurality of selectable control modes. Also, the device includes control means for controlling the drive means so as to drive the zoom lens in steps at a settable interval or to one of a plurality of stop positions. Further, the device includes display means for indicating a selected control mode or stop positions.

19 Claims, 7 Drawing Sheets

DEVICE FOR CONTROLLING A ZOOM LENS OF A CAMERA

BACKGROUND OF THE INVENTION AND RELATED ART STATEMENT

The present invention relates to a device for controlling a zoom lens of a camera.

Widely has been used a camera carrying a zoom lens, that is, a lens of variable focal length. In such a camera, it is usual to move the zoom lens to a predetermined position in accordance with rotation of an internally equipped motor. The drive of the motor is controlled by manual buttons. Specifically, the zoom lens is moved toward a wide angle limit position by pressing a wide angle button (zoom out button). The zoom lens is moved toward a telephoto limit position by pressing a telephoto button (zoom in button).

However, it is necessary to continue pressing the wide angle button or the telephoto button until a desired angle of view is obtained. Also, it is usual that the photographer executes zooming while viewing an object through a viewfinder for framing. Accordingly, it often occurs that the photographer delayingly releases the pressing and the zoom lens consequently overruns a desired position. Also, it occurs that the photographer stops the zoom lens before the desired position to avoid the overrun. Further, the photographer is liable to fail to have a shutter chance due to the fact of drawing his attention to the overrun. It will be apparent that it is difficult for the photographer to accurately stop the zoom lens at the desired position which provides a desired view angle.

SUMMARY OF THE INVENTION

It is an object of the present invention to provide a device for controlling a zoom lens of a camera which has overcome the above-mentioned drawbacks.

A device for controlling a zoom lens of a camera of the present invention comprises drive means for driving a zoom lens, control means for controlling the drive means, the control means having a plurality of selectable control modes including a linear mode in which the zoom lens is driven continuously, and a stepping mode in which the zoom lens is driven in steps, and selection means for selecting one of the plurality of selectable control modes.

Also, a device for controlling a zoom lens of a camera of the present invention comprises drive mean for driving a zoom lens, control means for controlling the drive means, the control means having a plurality of selectable control modes including a plurality of stepping modes in which the zoom lens is driven in steps, and selection means for selecting one of the plurality of selectable control modes.

Further, a device for controlling a zoom lens of a camera of the present invention comprises drive means for driving a zoom lens, control means for controlling the drive means so as to drive the zoom lens in steps at a settable interval, and setting means for setting a desired interval.

Furthermore a device for controlling a zoom lens of a camera of the present invention comprises drive means for driving a zoom lens, control means for controlling the drive means so as to drive the zoom lens to one of a plurality of stop positions, and display means for indicating the plurality of stop positions.

Yet furthermore, a device for controlling a zoom lens of a camera of the present invention comprises drive means for driving a zoom lens, control means for controlling the drive means, the control means having a plurality of selectable stepping modes having respective step intervals different from one another, selection means for selecting one of the plurality of selectable stepping modes, and display means for indicating a selected stepping mode and stop positions of the selected stepping mode.

Accordingly, a device of the present invention makes it possible to move the zoom lens to a desired position more easily and accurately.

Also, a device of the present invention provides an increased number of zoom lens movements, consequently giving the photographer an improved practicability and operability.

Further, the present invention enables the photographer to confirm a movement of the zoom lens on a display.

These and other objects, features and advantages of the present invention will become more apparent upon a reading of the following detailed description and drawings.

DETAILED DESCRIPTION OF PREFERRED EMBODIMENTS OF THE INVENTION

Figure 2:
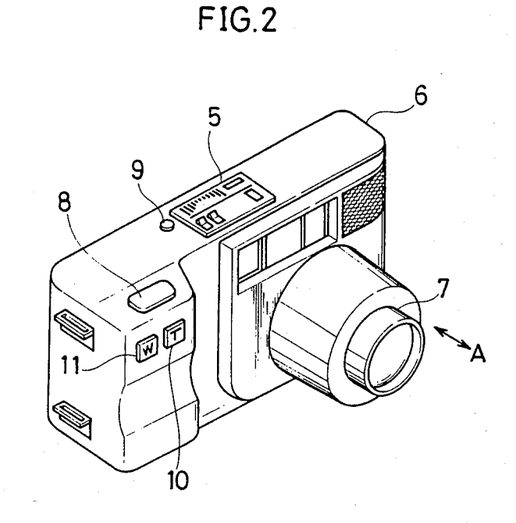
FIG. 2 is a perspective view showing a camera embodying the present invention, the camera having a zoom lens.

Referring now to FIG. 2 showing a zoomable camera embodying the present invention, the camera includes a main body 6, a lens barrel 7 carrying a zoom lens, a display portion 5 having a liquid crystal display (LCD) for displaying operation states, a shutter button 8, a zooming mode button 9, a telephoto button 10, and a wide angle button 11. The zoom lens incorporated in the lens barrel 7 is moved in directions of an arrow A by pressing the wide angle button 11 or the telephoto button 10.

Figure 3:
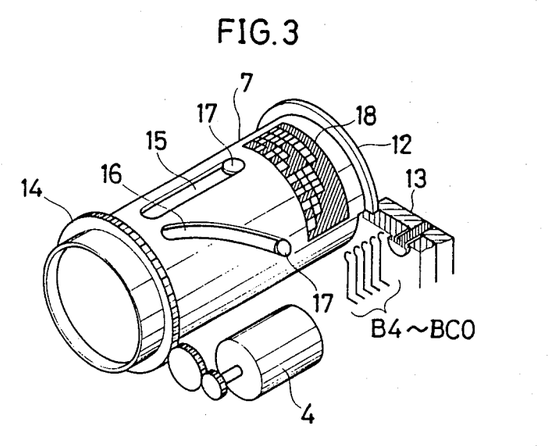
FIG. 3 is an enlarged perspective view showing a constructual relation among a lens barrel mounted on the camera, a zoom motor, an encoder, and encoder brushes.

More specifically, in FIG. 3, the lens barrel 7 has a flange 12 on a rear end portion thereof, and a gear 14 on a front end portion thereof. The flange 12 is supported by mount plates 13. The gear 14 is operatively connected with a zooming motor 4. Accordingly, the lens barrel 7 is rotated by the zooming motor 4. Also, the lens barrel 7 has a straight slot 15 and a curved slot 16 in the periphery wall thereof.

The zoom lens is slidably mounted in the lens barrel 7. Also, the zoom lens has two roller pins 17, 17 which are slidable along the straight slot 15 and the curved slot 16 respectively. The roller pins 17, 17 are fixedly attached to a front lens member of the zoom lens and a rear lens member of the zoom lens respectively.

The zoom lens is moved in accordance with the rotation of the lens barrel 7. Also focussing of the zoom lens is attained by the roller pins 17, 17 restrictedly movable in the straight slot 15 and the curved slot 16 respectively.

Indicated at 18 is a zoom encoder provided on the periphery surface of the lens barrel 7 to detect the rotation amount of the lens barrel 7, that is, the position of the zoom lens. The position is detected by encoder brushes B4 to B7, and a common encoder brush BC0 which are made in an electric contact or in magnetic contact with the periphery surface of the lens barrel 7. The zoom encoder 18 represents fifteen stop positions including a telephoto limit stop position and a wide angle limit stop position in a binary digital series of 4 bits. It should be noted that the four encoder brushes B4 to B7 are provided to correspond to the stop positions of the zoom encoder represented in the binary digital series of 4 bits.

Figure 4:
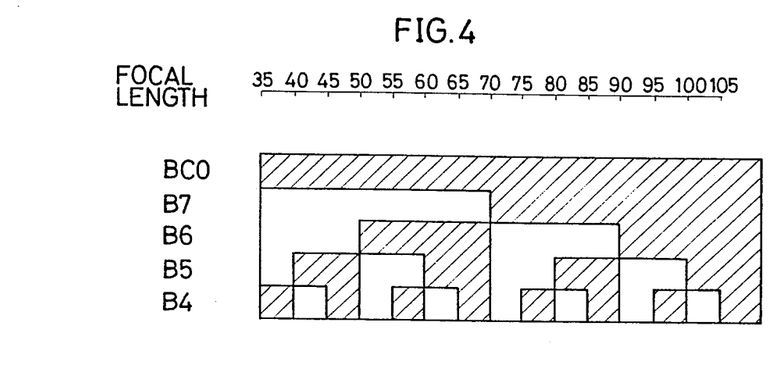
FIG. 4 is a diagram showing a detailed pattern of the encoder.

Referring to FIG. 4 showing a detailed pattern of the zoom encoder 18, a horizontal direction represents the rotational direction of the lens barrel 7, i.e., the position of the zoom lens, further i.e., the focal length of the zoom lens. A vertical direction represents digital positions of binary digital series of the zoom encoder 18. Hatched portions represent the logic 0 and blank portions represent the logic 1. This pattern is represented in the binary digital series as Table 1.

TABLE 1

| ADDRESS ZOOM POSITION | STOP DATA | ENCODER PATTERN | | | | FOCAL LENGTH (mm) |
|---|---|---|---|---|---|---|
| | | b3 | b2 | b1 | b0 | |
| 0 | X0 | 1 | 1 | 1 | 0 | 35–40 |
| 1 | X1 | 1 | 1 | 0 | 1 | 40–45 |
| 2 | X2 | 1 | 1 | 0 | 0 | 45–50 |
| 3 | X3 | 1 | 0 | 1 | 1 | 50–55 |
| 4 | X4 | 1 | 0 | 1 | 0 | 55–60 |
| 5 | X5 | 1 | 0 | 0 | 1 | 60–65 |
| 6 | X6 | 1 | 0 | 0 | 0 | 65–70 |
| 7 | X7 | 0 | 1 | 1 | 1 | 70–75 |
| 8 | X8 | 0 | 1 | 1 | 0 | 75–80 |
| 9 | X9 | 0 | 1 | 0 | 1 | 80–85 |
| A | X10 | 0 | 1 | 0 | 0 | 85–90 |
| B | X11 | 0 | 0 | 1 | 1 | 90–95 |
| C | X12 | 0 | 0 | 1 | 0 | 95–100 |
| D | X13 | 0 | 0 | 0 | 1 | 100–105 |
| E | X14 | 0 | 0 | 0 | 0 | 105– |

Figure 5:
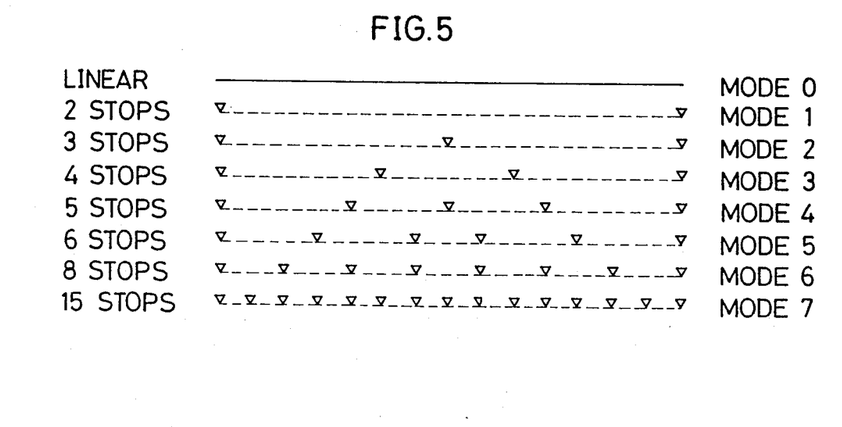
FIG. 5 is a diagram showing a relation between specified stop positions and zooming modes.

Zooming modes executable in the camera are shown in FIG. 5. The zoom lens has fifteen stop positions including the wide angle limit stop position and the telephoto limit stop position and this camera has eight zooming modes. Specifically, a horizontal direction of FIG. 5 corresponds to the movement direction of the zoom lens. The respective modes are shown in a vertical direction. Inverted triangle marks represent stop positions. In MODE 0 of a linear mode, for example, the zoom lens is not stopped until the telephoto button 10 or the wide angle button 11 is released from pressing or the lens reaches the telephoto/wide angle limit stop position. In other words, MODE 0 has no specified stop positions. Contrastingly, stepping modes of MODE 1 to MODE 7 have a predetermined number of stop positions. For example, MODE 4 has five stop positions including the wide limit stop position and the telephoto limit stop position.

Table 2 shows the relationship between the stop positions and the modes shown in FIG. 5. In Table 2, a digit of 0 represents "non-stop", a digit of 1 represents "stop", and letters of X0 to X14 represent respective stop positions.

TABLE 2

| | ZOOMING MODE | | | | | | | |
|---|---|---|---|---|---|---|---|---|
| | 0 | 1 | 2 | 3 | 4 | 5 | 6 | 7 |
| X0 | 1 | 1 | 1 | 1 | 1 | 1 | 1 | 1 |
| X1 | 0 | 0 | 0 | 0 | 0 | 0 | 0 | 1 |
| X2 | 0 | 0 | 0 | 0 | 0 | 0 | 1 | 1 |
| X3 | 0 | 0 | 0 | 0 | 0 | 1 | 0 | 1 |
| X4 | 0 | 0 | 0 | 0 | 1 | 0 | 1 | 1 |
| X5 | 0 | 0 | 0 | 1 | 0 | 0 | 0 | 1 |
| X6 | 0 | 0 | 0 | 0 | 0 | 1 | 1 | 1 |
| X7 | 0 | 0 | 1 | 0 | 1 | 0 | 0 | 1 |
| X8 | 0 | 0 | 0 | 0 | 0 | 1 | 1 | 1 |
| X9 | 0 | 0 | 0 | 1 | 0 | 0 | 0 | 1 |
| X10 | 0 | 0 | 0 | 0 | 1 | 0 | 1 | 1 |
| X11 | 0 | 0 | 0 | 0 | 0 | 1 | 0 | 1 |
| X12 | 0 | 0 | 0 | 0 | 0 | 0 | 1 | 1 |
| X13 | 0 | 0 | 0 | 0 | 0 | 0 | 0 | 1 |
| X14 | 1 | 1 | 1 | 1 | 1 | 1 | 1 | 1 |

Also, it is preferrable to make such zooming mode table changeable in accordance with photographer's needs so as to assure zooming operation which enables photographer's individual expressions.

Figure 1:
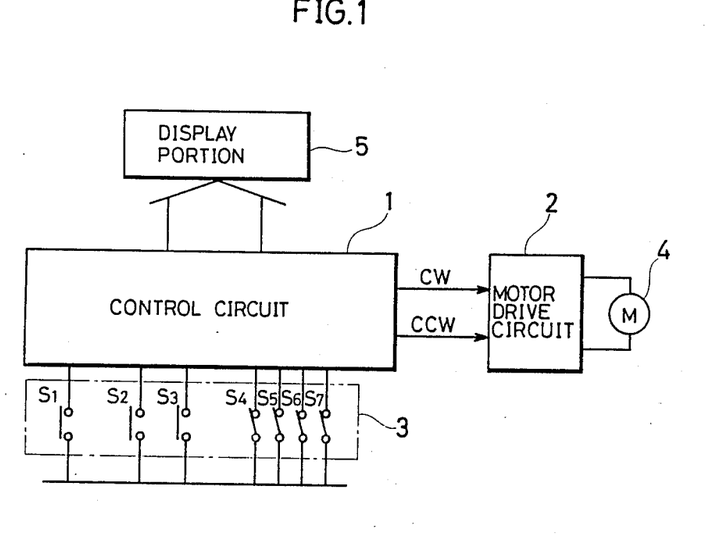
FIG. 1 is a block diagram showing a basic construction of a device for controlling a zoom lens in accordance with the present invention.

Referring now to FIG. 1 showing a basic construction of the device for controlling the zoom lens, a control circuit 1 includes a central processing unit (CPU), and memories such as ROM for holding a number of data and operation programs. The control circuit 1 receives a signal concerning the zooming mode button 9, a signal concerning the telephoto button 10, a signal concerning the wide angle button 11 and signals concerning the encoder brushes B4 to BC0 and then sends two command signals for controlling the movement of the zoom lens. One of the command signals is a CCW signal for moving the zoom lens toward the telephoto limit stop position, the other is a CW signal for moving the zoom lens toward the wide angle limit stop position. Also, the zoom lens is stopped when both CCW signal and CW signal are issued at the same time.

A motor drive circuit 2 sends a driving signal or a stopping signal to a motor 4 in accordance with the command signal from the control circuit 1.

The display portion 5 displays the life of the battery, the frame number, and the zooming mode so that the photographer can confirm the operation state. The linear mode of MODE 0 and the stepping modes of MODE 1 to MODE 7 are separately displayed. Also, each of the stepping modes is displayed by use of fifteen indicator bars corresponding to the fifteen stop positions.

A switch portion 3 includes a switch S1 corresponding to the zooming mode button 9, a switch S2 corresponding to the telephoto button 10, a switch S3 corresponding to the wide angle button 11 and switches S4 to S7 corresponding to the encoder brushes B4 to B7.

Figure 6:
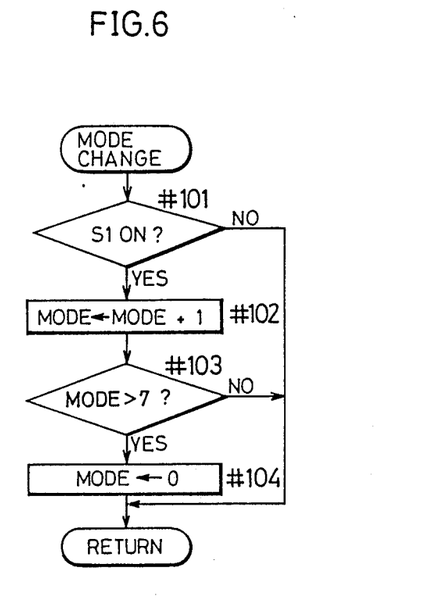
FIG. 6 is a flowchart showing a routine for selecting a zooming mode of the camera.

Next, operations of the device for controlling the zoom lens will be described with reference to FIGS. 6 and 7. FIG. 6 shows a routine for selecting a desired zooming mode. It is discriminated in Step #101 whether the switch S1 is turned on, that is, the zooming mode button 9 is pressed down. If the switch S1 is turned on (YES in Step #101), the routine advances to Step #102 in which 1 is added to a number stored in a mode register MODE. A number stored in the register MODE represents a present zooming mode. Numbers 0 to 7 represent MODE 0 to MODE 7 respectively. Subsequently, it is checked in Step #103 whether a number stored in the register MODE is higher than 7. If the number stored in the register MODE is not higher than 7 (NO in Step #103) the routine returns to a main routine (not shown). On the other hand, if the number stored in the register MODE is higher than 7 (YES in Step #103), the routine advances to Step #104 in which the number stored in the register MODE is set at 0, that is, the zooming mode is set in MODE 0 and returns to the main routine. Also, if the switch S1 is not turned on (NO in Step #101), the routine returns to the main routine.

Figure 8A:
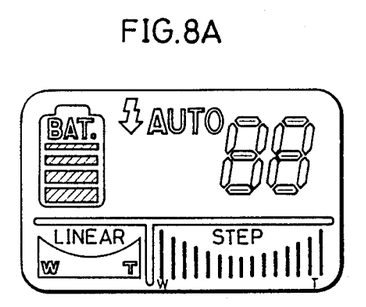
FIGS. 8A, 8B, 8C are diagrams showing a display portion of the camera.
Figure 8B:
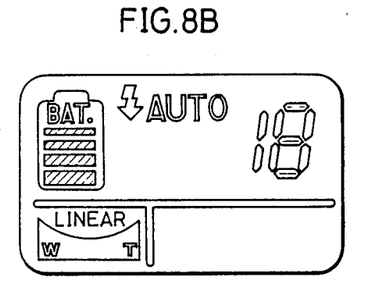
Figure 8C:
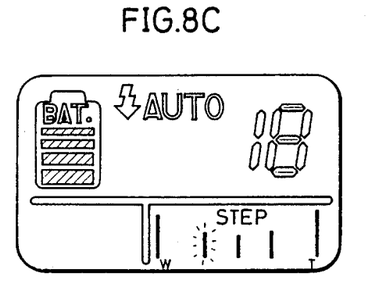

When the zooming mode is changed as mentioned above, the control circuit 1 sends a display signal to the display portion 5 to display the changed mode. When the zooming mode is changed to MODE 0 of the linear mode, for example, an indication shown in FIG. 8B is displayed on the display portion 5. Specifically, letters of "LINEAR" and a figure provided below the letters are lighted. When the zooming mode is changed to MODE 4 of the stepping mode, for example, an indication shown in FIG. 8C is displayed on the display portion 5, specifically, letters of "STEP" and indicator bars are lighted which correspond to specified stop position of the stepping mode (MODE 4). Also, one of the indicator bars is turned on and off which corresponds to the present position of the zoom lens. In FIG. BC, the second indicator bar is turned on and off.

Figure 7:
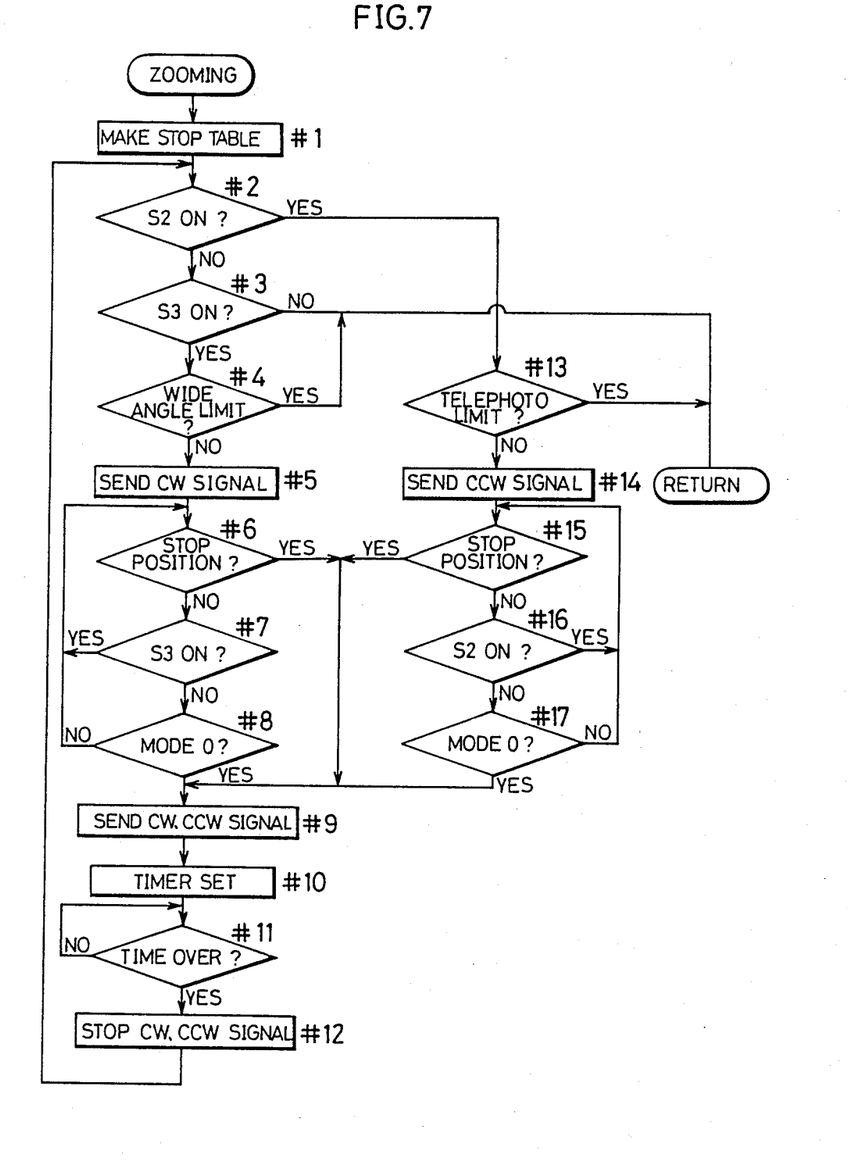
FIG. 7 is a flowchart showing a routine for executing a zooming operation of the camera.

After a desired mode is selected, the zooming control is executed in accordance with a flowchart of FIG. 7. First, a stop table of the selected zooming mode is made in Step #1. The stop table is made by setting the stop data shown in Table 2 the fifth bit b4 in Table 1. For example, the stop table of MODE 4 is shown in Table 3.

TABLE 3

| ADDRESS ZOOM POSITION | STOP DATA b4 | ENCODER PATTERN b3 | b2 | b1 | b0 | FOCAL LENGTH (mm) |
|---|---|---|---|---|---|---|
| 0 | 1 | 1 | 1 | 1 | 0 | 35–40 |
| 1 | 0 | 1 | 1 | 0 | 1 | 40–45 |
| 2 | 0 | 1 | 1 | 0 | 0 | 45–50 |
| 3 | 0 | 1 | 0 | 1 | 1 | 50–55 |
| 4 | 1 | 1 | 0 | 1 | 0 | 55–60 |
| 5 | 0 | 1 | 0 | 0 | 1 | 60–65 |
| 6 | 0 | 1 | 0 | 0 | 0 | 65–70 |
| 7 | 1 | 0 | 1 | 1 | 1 | 70–75 |
| 8 | 0 | 0 | 1 | 1 | 0 | 75–80 |
| 9 | 0 | 0 | 1 | 0 | 1 | 80–85 |
| A | 1 | 0 | 1 | 0 | 0 | 85–90 |
| B | 0 | 0 | 0 | 1 | 1 | 90–95 |
| C | 0 | 0 | 0 | 1 | 0 | 95–100 |
| D | 0 | 0 | 0 | 0 | 1 | 100–105 |
| E | 1 | 0 | 0 | 0 | 0 | 105– |

Thereafter, the zooming control is executed in accordance with the selected zooming mode. It is discriminated whether the switch S2 is turned on, that is the telephoto button 10 is pressed down. If the switch S2 is not turned (NO in Step #2, the routine advances to Step #3 in which it is discriminated whether the switch S3 is turned on, that is, the wide angle button 11 is pressed down. If the switch S3 is not turned on (NO in Step #3), the routine returns to the main routine. Simultaneously, the power supply to the zooming motor 4 is stopped. If the switch S3 is turned on (YES in Step #3), the routine advances to Step #4 in which it is discriminated whether the zoom lens is at the wide angle limit stop position. If the zoom lens is at the wide angle limit stop position, the routine returns to the main routine. On the other hand, if the zoom lens is not at the wide angle limit stop position (NO in Step #4), the routine advances to Step #5 in which the control circuit 1 sends the CW signal to the motor drive circuit 2 so as to move the zoom lens toward the wide angle limit stop position. It is checked in Step #6 whether the zoom lens reaches a specified stop position of the selected mode. This check is accomplished by comparing positional signals sent from the encoder brushes B4 to B7 with data of the stop table. The encoder brushes B4 to B7 continue to read out the positional data of the encoder 18. When the zoom lens reaches the specified stop position, the routine advances to Step #9 in which both CW signal and CCW signal are sent at the same time so as to stop the motor 4. When the zoom lens does not reach the specified stop position, the routine advances to Step #7 in which it is discriminated whether the switch S3 is turned on. If the switch S3 is turned on (YES in Step #7), the routine returns to Step #6 and then repeats the same operation until the zoom lens reaches the specified stop position. On the other hand. If the switch S3 is not turned on (NO in Step #7), the routine advances to Step #8 in which it is discriminated whether the selected mode is MODE 0. When the selected mode is not MODE 0 (NO in Step #8), the routine returns to Step #6 and then repeats the same operation until the zoom lens reaches the specified stop position. On the other hand, when the selected mode is MODE 0 or the linear mode YES in Step #8), the routine advances to Step #9 in which the motor 4 is stopped. Simultaneously, in Step #10, a timer is set at a specified time which is longer than a time from braking of the motor 4 to complete stop of the zoom lens. In other words, in the stepping mode, the specified time corresponds to a time for holding the zoom lens at a specified stop position of the stepping mode. The specified time can be desirably changed by the user. Thereafter, it is checked in Step #11 whether the timer is over the specified time. This check is repeated until the timer is over the specified time. When the timer is over, the sending of CW and CCW signals is stoped in Step #12 and the routine returns to Step #2 in which it is discriminated again whether the switch S2 is turned on.

On the other hand. If the switch S2 is turned on YES in Step #2, the routine advances to Step #13 in which it is discriminated whether the zoom lens is at the telephoto limit stop position. If the zoom lens is at the telephoto limit stop position, the routine returns to the main routine. On the other hand, if the zoom lens is not at the telephoto limit stop position (NO in Step #13), the routine advances to Step #14 in which the control circuit 1 sends the CCW signal to the motor drive circuit 2 so as to move the zoom lens toward the telephoto limit stop position. It is checked in Step #15 whether the zoom lens reaches a specified stop position of the selected mode. When the zoom lens reaches the specified stop position, the routine advances to Step #9. When the zoom lens does not reach the stop position, the routine advances to Step #16 in which it is discriminated whether the switch S2 is turned on. If the switch S2 is turned on (YES in Step #16), the routine returns to Step #15 and then repeats the same operation until the zoom lens reaches the specified stop position. On the other hand, if the switch S2 is not turned on (NO in Step #16), the routine advances to Step #17 in which it is discriminated whether the selected mode is MODE 0. When the selected mode is not MODE 0 (NO in Step #17), the routine returns to Step #15 and then repeats the same operation until the zoom lens reaches the specified stop position. When the selected mode is MODE 0 or the linear mode (YES in Step 17), the routine advances to Step #9.

Consequently, one pressing of the wide angle button 11 or the telephoto button 10 causes the zoom lens to move to a first stop positon of a selected zooming mode. Another pressing causes the zoom lens to move to the next stop position of the selected zooming mode. Then, subsequent continuous pressing causes the zoom lens to move toward the wide angle limit stop position or the telephoto limit stop position. Also, the zoom lens is Stopped by releasing the pressing. Further, the zoom lens is steppedly moved toward the wide angle limit stop position or the telephoto limit stop position owing to the specified stop time. Accordingly, it could be seen that the zoom lens can be stopped at a predetermined position with an increased accuracy and with ease.

Figure 9A:
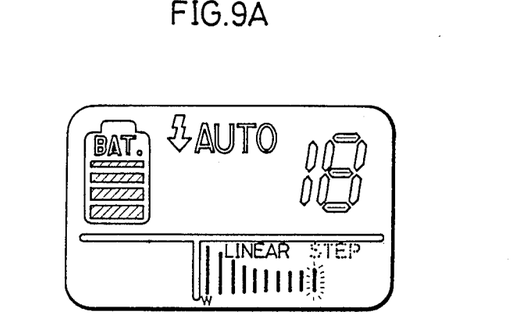
FIGS. 9A, 9B are diagrams showing another display portion.
Figure 9B:
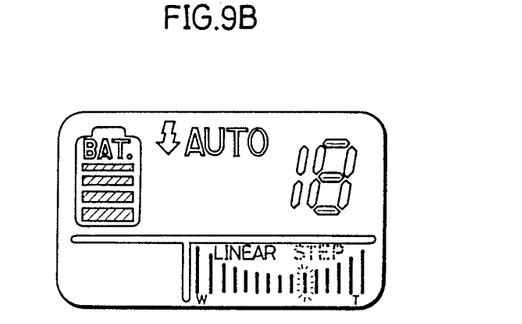

FIGS. 9A, 9B show other embodiments displaying the linear mode. In the display of FIG. 9A, letters of "LINEAR" are lighted to indicate the linear mode. Also, indicator bars are lighted which correspond to positions from the wide angle limit stop position to the present stop position of the zoom lens. In the display of FIG. 9B, letters of "LINEAR" are lighted to indicate the linear mode. Also, all indicator bars are lighted except an indicator bar being turned on and off which corresponds to the present position of the zoom lens.

It will be seen that the present invention can be applied to a zoom strobe whose illuminating angle can be changed as well as a zoom lens.

Although the present invention has been fully described by way of example with reference to the accompanying drawings it is to be understood that various changes and modifications will be apparent to those skilled in the art. Therefore, unless otherwise such changes and modifications depart from the scope of the invention, they should be construed as being included therein.

What is claimed is:

1. A device for controlling a zoom lens of a camera comprising:
    drive means for driving a zoom lens;
    control means for controlling the drive means, the control means having a plurality of selectable control modes including a linear mode in which the zoom lens is driven continuously, and a stepping mode in which the zoom lens is driven in steps; and
    selection means for selecting one of the plurality of selectable control modes.

2. A device according to claim 1 further comprising display means for indicating a selected control mode.

3. A device according to claim 2 wherein the display means has a first display portion for indicating the linear mode and a second display portion for indicating the stepping mode.

4. A device according to claim 2 wherein the display means has a first display portion for indicating a focal length of the zoom lens and a second display portion for indicating a selected control mode.

5. A device for controlling a zoom lens of a camera comprising:
    drive means for driving a zoom lens;
    control means for controlling the drive means, the control means having a plurality of selectable control modes including a plurality of stepping modes in which the zoom lens is driven in steps; and
    selection means for selecting one of the plurality of selectable control modes.

6. A device according to claim 5 wherein the plurality of stepping modes have respective step intervals different from one another.

7. A device according to claim 6 wherein the respective step intervals consist of predetermined numbers of unit intervals, the unit interval being one of a given number of divided intervals of a whole movable range of the zoom lens.

8. A device according to claim 5 wherein the plurality of stepping modes have different numbers of stop positions respectively.

9. A device according to claim 5 further comprising display means for indicating a selected control mode.

10. A device according to claim 5 further comprising display means for indicating a focal length of the zoom lens.

11. A device according to claim 10 wherein the display means has a display portion for indicating a focal length of the zoom lens in the form of a range from a shortest focal length of the zoom lens to a present focal length of the zoom lens.

12. A device according to claim 5 further comprising display means for indicating a stop position.

13. A device for controlling a zoom lens of a camera comprising:
    drive means for driving a zoom lens;
    control means for controlling the drive means so as to drive the zoom lens in steps at a settable interval; and
    setting means for setting a desired interval.

14. A device according to claim 13 further comprising display means for indicating a focal length of the zoom lens.

15. A device according to claim 14 wherein the display means has a display portion for indicating the focal length of the zoom lens in the form of a range from a shortest focal length of the zoom lens to a present focal length of the zoom lens.

16. A device for controlling a zoom lens of a camera comprising:
    drive means for driving a zoom lens;
    control means for controlling the drive means so as to drive the zoom lens to one of a plurality of stop positions; and
    display means for indicating the pluralitY of stop positions.

17. A device according to claim 16 wherein the display means includes means for indicating a present position of the zoom lens.

18. A device according to claim 17 wherein the display means comprises a plurality of indicating elements corresponding to the plurality of stop positions, an indicating element corresponding to a present position of the zoom lens being changed to a state different from the other indicating elements so as to indicate the present position of the zoom lens.

19. A device for controlling a zoom lens of a camera comprising:
    drive means for driving a zoom lens;
    control means for controlling the drive means, the control means having a plurality of selectable stepping modes having respective step intervals different from one another;
    selection means for selecting one of the plurality of selectable stepping modes; and
    display means for indicating a selected stepping mode and stop positions of the selected stepping mode.

* * * * *

UNITED STATES PATENT AND TRADEMARK OFFICE
CERTIFICATE OF CORRECTION

PATENT NO. : 4,945,371

DATED : July 31, 1990

INVENTOR(S) : Takeshi Hashimoto, et al.

It is certified that error appears in the above-identified patent and that said Letters Patent is hereby corrected as shown below:

In col. 3, line 10, after "Also", insert --,-- (comma).

In col. 4, line 35, change "ROM" to --ROMs--.

In col. 5, line 32, change "FIG. BC" to --FIG. 8C--.

In col. 6, line 26, change ". If" to --, if--.

In col. 6, line 34, before "YES", insert --(-- (parenthesis).

In col. 6, line 50, change ". If" to --, if--.

In col. 6, lines 50 and 51, change "YES in Step #2" to --(YES in Step #2)--.

In col. 7, line 18, change "Stopped" to --stopped--.

In col. 7, line 38, after "drawings", insert --,-- (comma).

UNITED STATES PATENT AND TRADEMARK OFFICE
CERTIFICATE OF CORRECTION

PATENT NO. : 4,945,371

DATED : July 31, 1990

INVENTOR(S) : Takeshi Hashimoto, et al.

It is certified that error appears in the above-identified patent and that said Letters Patent is hereby corrected as shown below:

In col. 8, line 46 (claim 16, line 7), change "pluralitY" to --plurality--.

Signed and Sealed this

Third Day of December, 1991

Attest:

HARRY F. MANBECK, JR.

Attesting Officer

Commissioner of Patents and Trademarks